(12) United States Patent
Kim

(10) Patent No.: US 8,300,017 B2
(45) Date of Patent: Oct. 30, 2012

(54) MOBILE ELECTRONIC APPARATUS WITH TOUCH INPUT DEVICE AND DISPLAY METHOD USING THE SAME

(75) Inventor: Tae Hun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 969 days.

(21) Appl. No.: 11/766,912

(22) Filed: Jun. 22, 2007

(65) Prior Publication Data

US 2008/0174562 A1 Jul. 24, 2008

(30) Foreign Application Priority Data

Jan. 20, 2007 (KR) ........................ 10-2007-0006382

(51) Int. Cl.
*G06F 3/041* (2006.01)
(52) U.S. Cl. ........................ 345/173; 715/784
(58) Field of Classification Search .................. 345/173; 715/784
See application file for complete search history.

(56) References Cited

U.S. PATENT DOCUMENTS

| | | | |
|---|---|---|---|
| 5,704,037 A * | 12/1997 | Chen ............................ | 345/184 |
| 6,154,210 A * | 11/2000 | Anderson ...................... | 715/840 |
| 6,259,432 B1 * | 7/2001 | Yamada et al. ............... | 345/159 |
| 6,489,951 B1 * | 12/2002 | Wong et al. ................... | 345/173 |
| 6,975,306 B2 * | 12/2005 | Hinckley et al. .............. | 345/173 |
| 2004/0088727 A1 * | 5/2004 | Kamiya ......................... | 725/52 |
| 2004/0100451 A1 * | 5/2004 | Okada ........................... | 345/173 |
| 2005/0024341 A1 * | 2/2005 | Gillespie et al. .............. | 345/173 |
| 2005/0083299 A1 * | 4/2005 | Nagasaka ...................... | 345/156 |
| 2005/0162399 A1 * | 7/2005 | Yamada ......................... | 345/173 |

FOREIGN PATENT DOCUMENTS

| | | |
|---|---|---|
| KR | 10-1999-0026660 | 4/1999 |
| KR | 10-2004-0015427 | 2/2004 |
| KR | 10-2005-0051382 | 12/2006 |
| WO | WO 2006/066742 | 6/2006 |

* cited by examiner

*Primary Examiner* — Amare Mengistu
*Assistant Examiner* — Vinh Lam
(74) *Attorney, Agent, or Firm* — Lee, Hong, Degerman, Kang & Waimey

(57) ABSTRACT

A mobile terminal having a touch input device and a method using the same are provided. The mobile terminal includes a display unit having a touch screen for displaying a data information, the touch screen having a display area configured for a touch input area, and a controller for controlling movement of at least part of the data information on the display area configured in response to a touching location on the touch input area, wherein the touch input area corresponds to an area where the data information is displayed.

27 Claims, 11 Drawing Sheets

MOBILE ELECTRONIC APPARATUS WITH TOUCH INPUT DEVICE AND DISPLAY METHOD USING THE SAME

CROSS REFERENCE TO RELATED APPLICATION

Pursuant to 35 U.S.C. §119(a), this application claims the benefit of earlier filing date and right of priority to Korean Patent Application No. 10-2007-0006382 filed Jan. 20, 2007, the contents of which are hereby incorporated by reference herein in their entirety.

FIELD OF THE INVENTION

The present invention is directed to an electronic apparatus with a touch input device, and more particularly to an electronic apparatus with a touch input device and display method using the same capability of conveniently changing information to be displayed using features of the touch input device.

DESCRIPTION OF THE RELATED ART

Generally, an electronic device equipped with a touch screen provides convenient access to information through the touch screen directly touched by a user to proceed into a desired menu or information.

However, conventional direction keys are often used to move information displayed on the touch screen, for example, to move displayed pages or lines up/down.

Even if an indicator or an icon, such as a scroll bar displayed on the touch screen, is used to move displayed information, an electronic device with a small-sized screen, such as a mobile terminal, is subject to errors if a user fails to touch an exact position due to a small size of the scroll bar.

Therefore, the electronic device with the touch screen generally has a problem in that features of the touch screen are not fully used for moving the displayed information.

SUMMARY OF THE INVENTION

An object of the present invention is to provide a mobile communication terminal and a method for managing messages that can reduce a message entry time by improving a message entry speed.

Additional advantages, objects and features of the invention will be set forth in part in the description which follows and in part will become apparent to those having ordinary skill in the art upon examination of the following or may be learned from practice of the invention.

In an embodiment of the present invention, a method of controlling display in a mobile terminal comprising a touch screen having a display area that operates as a touch input area is provided. The method includes displaying data information on the display area, wherein the data information is distinguished from graphic icons, and controlling movement of at least part of the data information on the display area in response to a touching location on the touch input area, wherein the touching input area corresponds to an area where the data information is displayed.

It is contemplated that the touch input area includes a plurality of regions, each region being configured to provide different movement of the data information when touching is detected. It is further contemplated that the touch input area includes a reference to control movement of the at least part of the data information in response to determining a distance from the reference to a touching point.

It is contemplated that the method further includes recognizing a reference with respect to the touch input area to control movement of the at least part of the data information in response to determining a distance from the reference to a touching point. It is further contemplated that the touch input area includes a reference to control movement of the at least part of the data information in response to determining a direction from the reference to a touching point.

It is contemplated that the touch input area includes a reference to control selection of the at least part of the data information in response to determining a direction from the reference to a touching point. It is further contemplated that the reference is one of a point and a line.

It is contemplated that the movement speed of the data information is varied in response to the touching location. It is further contemplated that the movement of at least part of the data information on the display area is controlled in response to a touching manner on the touch input area.

It is contemplated that the touching manner includes a touch duration of the touch screen. It is further contemplated that the movement speed of the data information is varied in response to the touching manner. It is further contemplated that in response to the touching manner, the movement of the data information is constantly maintained.

It is contemplated that the data information of the same file is displayed in a page-by-page manner in response to touching of the touching location. It is further contemplated that the data information is displayed in a file-by-file manner in response to touching of the touching location.

It is contemplated that the step of displaying data information on the display area is in response to executing an application program initiated by using the touch input area.

It is contemplated that a feedback is provided in response to touching of the touch input area. It is further contemplated that the feedback includes one of an indicator icon being displayed on the display area and a vibrating feedback.

In another embodiment of the present invention, a mobile terminal is provided. The mobile terminal including a display unit having a touch screen for displaying a data information, the touch screen having a display area configured for a touch input area, and a controller for controlling movement of at least part of the data information on the display area in response to a touching location on the touch input area, wherein the touch input area corresponds to an area where the data information is displayed.

It is contemplated that the touch input area includes a plurality of regions, each region being configured to provide different movement of the data information when a touch is detected. It is further contemplated that the touch input area includes a reference to control movement of the at least part of the data information in response to determining a distance from the reference to a touching point.

It is contemplated that the data information of the same file is displayed in a page-by-page manner in response to touching of the touching location. It is further contemplated that the data information is displayed in a file-by-file manner in response to touching of the touching location.

It is contemplated that a feedback is provided in response to touching of the touch input area. It is further contemplated that the feedback includes one of an indicator icon being displayed on the display area and a vibrating feedback.

It is contemplated that the controller displays the at least part of the data information as scrolling the data information in a predetermined speed. It is further contemplated that the speed of the scroll is variable according to the position of the touched point. It is further contemplated the speed of the scroll is increased when the touch is maintained.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
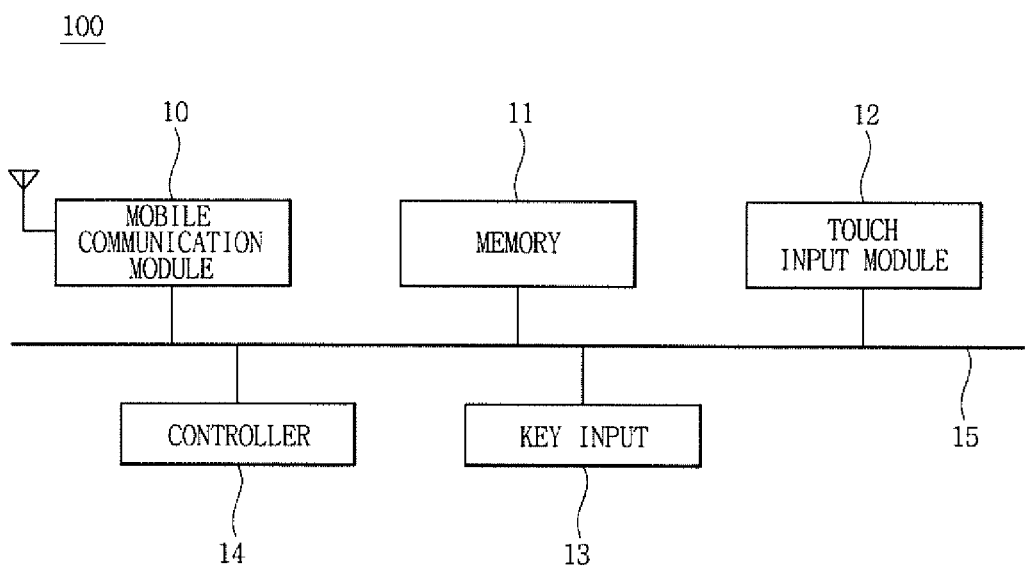
FIG. 1 is a block diagram illustrating an electronic device with a touch input module, according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter but can be implemented in diverse forms. The matters defined in the description, such as the detailed construction and elements, are nothing but specific details provided to assist those of ordinary skill in the art in a comprehensive understanding of the invention. The present invention is only defined within the scope of the appended claims. In the entire description of the present invention, the same drawing reference numerals are used for the same elements across various figures.

The embodiments of the present invention will be described in detail with reference to the accompanying drawings.

FIG. 1 is a block diagram illustrating an electronic device 100 with a touch input module according to an embodiment of the present invention.

The electronic device 100 with the touch input module may include various types of electronic devices having a touch screen, such as a computer, a Personal Digital Assistance (PDA), and a mobile communication terminal. Hereinafter, a mobile terminal with a communication function will be used as an example to describe the electronic device with the touch input module according to the embodiment of the present invention.

Figure 2:
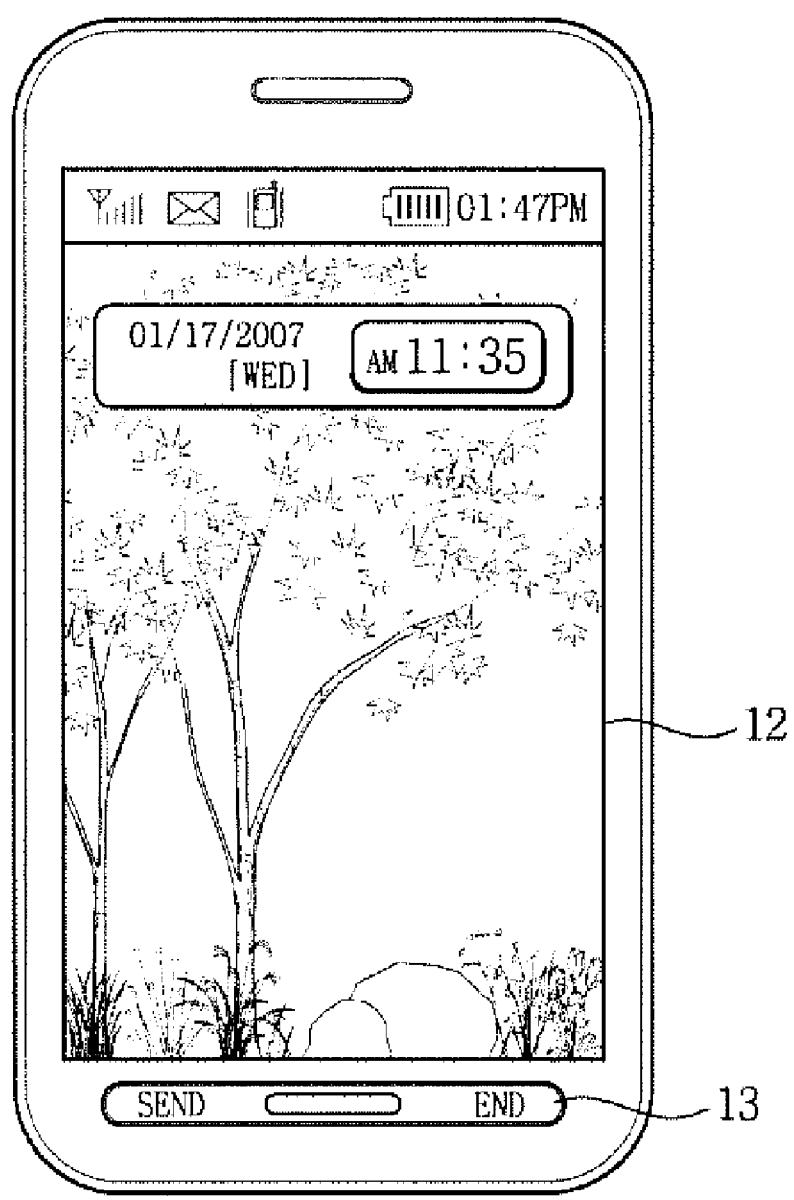
FIG. 2 illustrates a mobile terminal to which the present invention is applicable.
Figure 3:
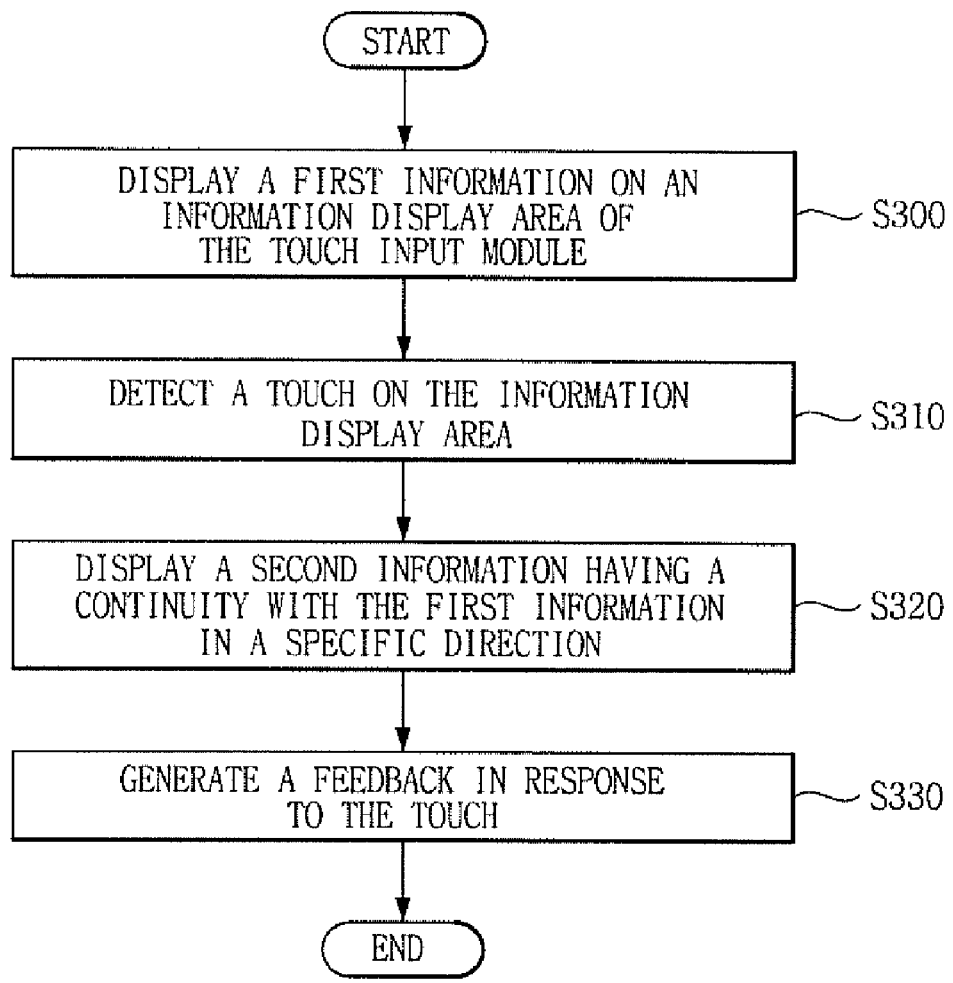
FIG. 3 is a flow chart illustrating a method for displaying information using the electronic device with the touch input module, according to a first embodiment of the present invention.

FIG. 2 illustrates a mobile terminal 100 to which the present invention is applicable.

According to the embodiment of the present invention, the electronic device 100 comprises a mobile communication module 10, a memory 11, a touch input module 12, a key input 13, and a controller 14. These elements are connected to each other through a bus 15.

The communication module 10 is a mobile communication device for transmitting and receiving data through a mobile communications network. For example, the electronic device 100 may transmit and receive a message or a call using the communication module 10.

The memory 11 stores programs for controlling general operations of the electronic device 100, and further stores various data input, output and processed during the general operations of the electronic device 100 by the controller 14.

Particularly, the memory 11 may store various types of information capable of being displayed on the touch input module 12. Examples for these types of information may be moving pictures, images and texts.

The touch input module 12 may perform a function for displaying various types of information or an operation status of the electronic device 100 according to a control signal from the controller 14. At the same time, the touch input module 12 may further perform a function for inputting various types of information or commands through a user's touch by employing a touch sensing technique.

The key input 13 includes at least one key assigned with a predetermined function such as various number keys or directional keys to input various information and commands from the user.

The controller 14 controls the elements of the electronic device 100, such as a mobile phone, and the general operations thereof.

Besides the above-mentioned elements, the electronic device 100 may further comprise at least one of a broadcast signal receiver module, a communication module for a communication through a wireless Internet, a camera module, a vibration module for generating a vibration, and various sensors.

An information display method, according to the embodiment of the present invention, may be performed by using the electronic device 100 described above with reference to FIG. 1.

The information display method using the electronic device 100, according to the embodiment of the present invention, will be described in more detail with reference to FIGS. 1 to 9.

The touch input module 12 displays information on an information display area having a predetermined size in accordance with a control signal from the controller 14 (S300).

Figure 4:
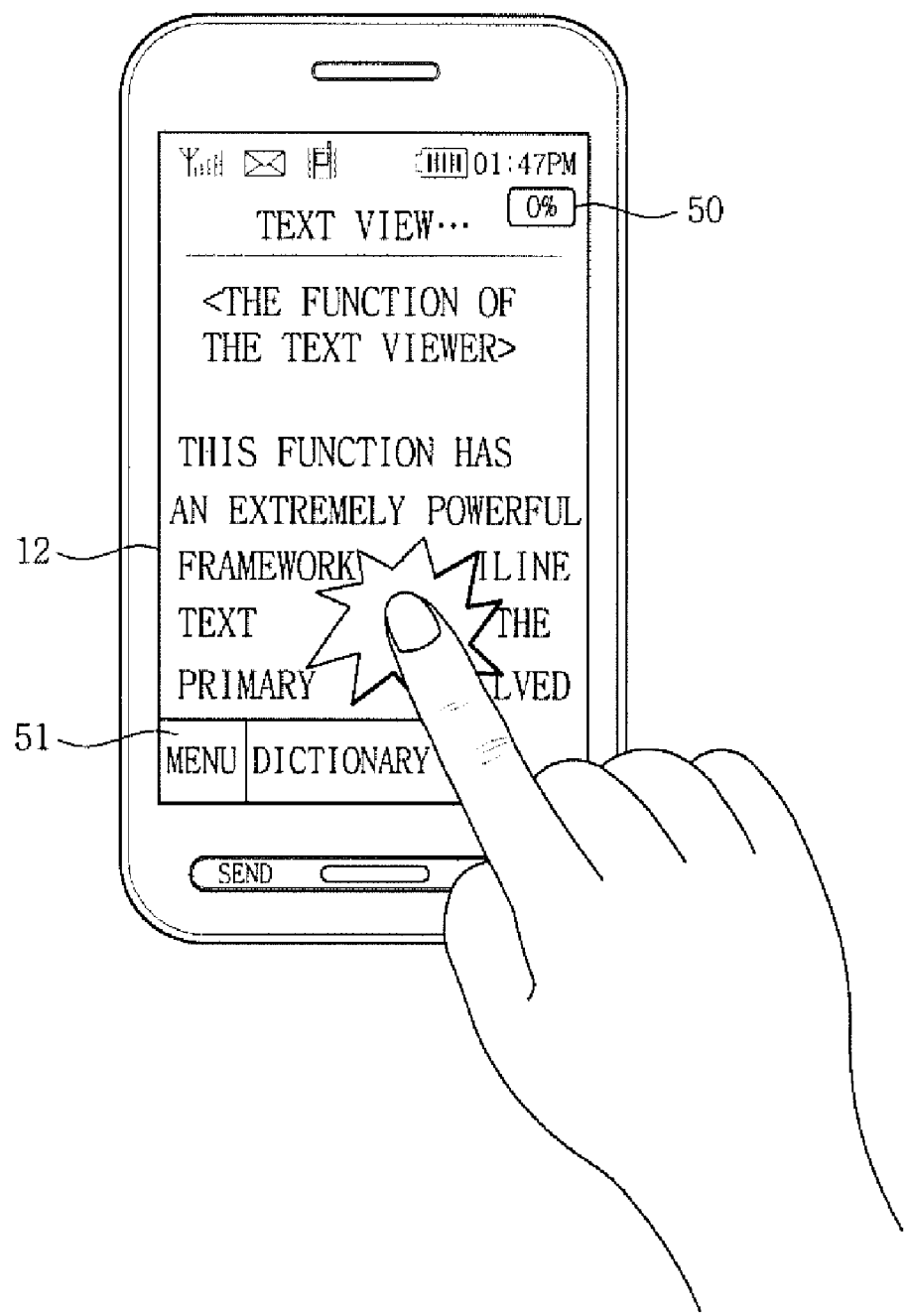
FIG. 4 illustrates an example of a screen for a user to touch a specific point on an information display area, according to the first embodiment of the present invention.

Referring to FIG. 4, text is displayed on the touch input module 12. A reference numeral 50 represents an indicator for showing a position of currently displayed text in the entire text. As illustrated in FIG. 4, the indicator displays a value of "0%" which means that the currently displayed text belongs to a first page of the entire text.

Moreover, the touch input module 12 may display at least one icon for enabling specific functions such as proceeding to a specific menu or performing a specific function.

The controller 14 detects a user's touch on a specific point of the information display area (S310). The touch input module 12 may transmit a coordinate of the touched point to the controller 14.

Accordingly, the controller 14 controls the information display area to display new information having continuity with respect to the currently displayed information in a specific direction that is determined based on the position of the touched point (S320).

The specific direction may be determined according to the position of the touched point with respect to a reference point or a reference line in the information display area. For example, the specific direction may be a direction pointed by a vector having an origin at the reference point and an end point at the touched point.

The reference point may be set in various ways. For example, the reference point may be at a center of the touch input module 12 or at a center of the information display area. Hereinafter, the reference point will be assumed at the center of the information display area.

Figure 7:
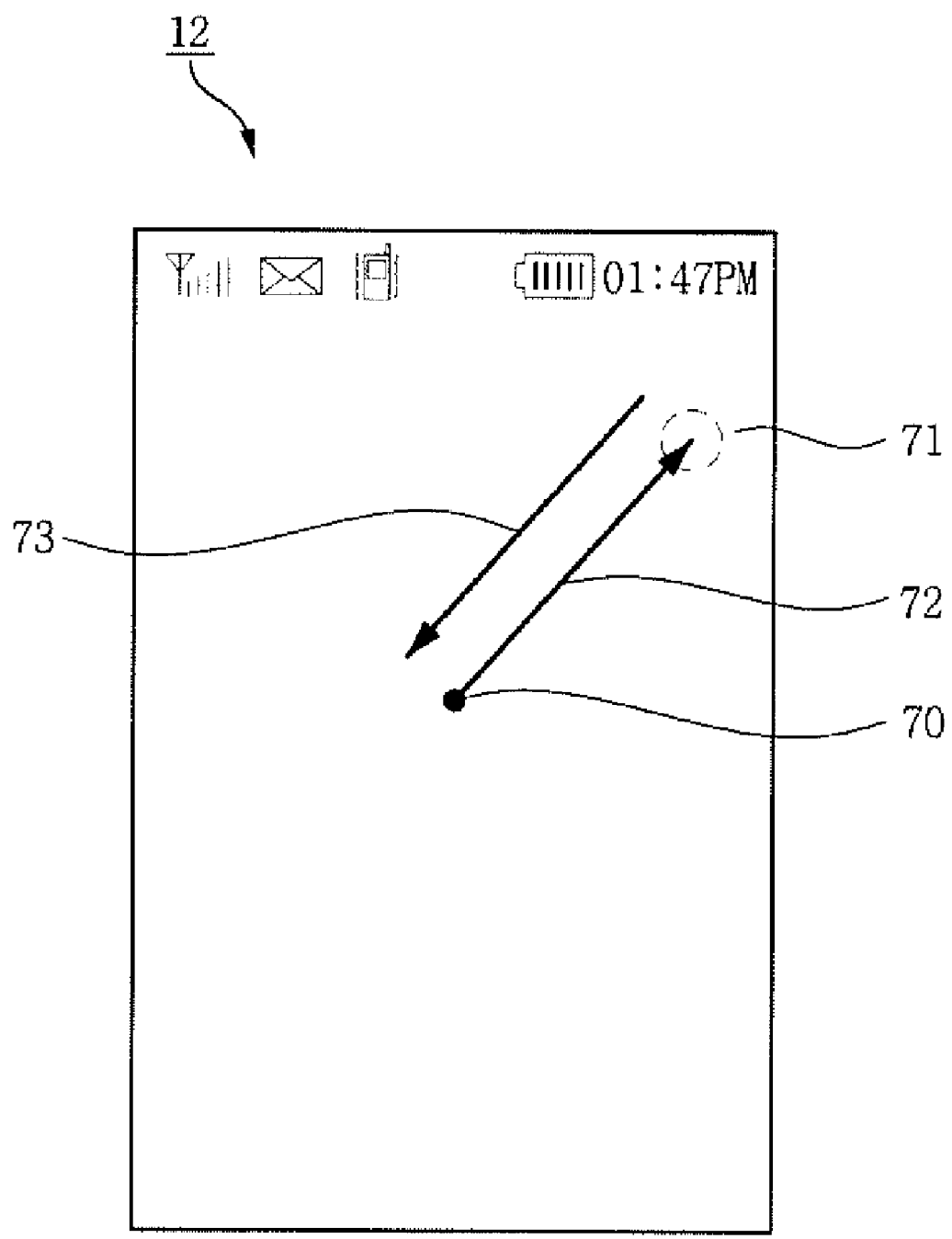
FIG. 7 illustrates a specific direction pointed by a vector, according to the first embodiment of the present invention.

Referring to FIG. 7, a reference numeral 70 represents the position of the reference point and a reference numeral 71 represents the position of the touched point. Here, the specific direction may be a direction pointed by a vector 72 having an origin at the reference point 70 and an end point at the touched point 71.

On the contrary, the specific direction may be a direction pointed by a vector 73 having an origin at the touched point 71 and an end point at the reference point 70.

The reference line may be set in various ways. For example, a line represented by a reference numeral 80 in FIG. 8 may be set as the reference line.

Furthermore, the touch module information display area may comprise a reference to control selection of at least part of the new data information in response to determining a direction from the reference to a touching point. The continuity of information will be described through the following examples. For example, text displayed on a screen in FIG. 4 has the continuity with text displayed on screens in FIGS. 5 and 6, since the text in FIGS. 5 and 6 are continued from the text in FIG. 4.

Alternatively, an image has the continuity with another image when they are parts of one big image. This happens when the entire image is too big to be displayed in a screen. Unless the entire image is reduced, the screen may display only a part of the entire image. Thus, the screen has to be changed from the part of the entire image to another part of the entire image to show the entire image. That is, the displayed image on the screen has to be moved to show the entire image.

Figure 5:
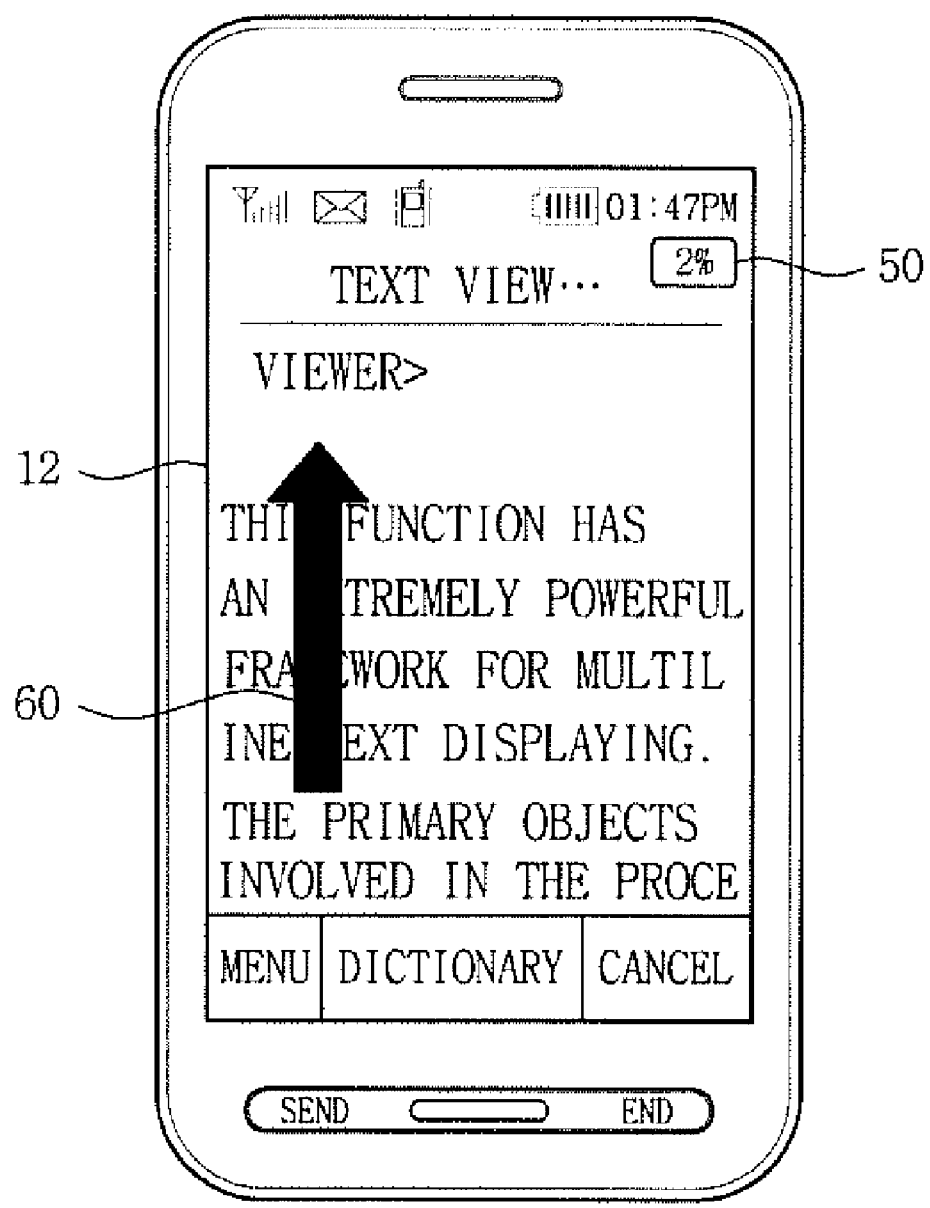
FIG. 5 illustrates an example of a screen scrolled on a line-by-line basis from a previous screen, according to the first embodiment of the present invention.

In FIG. 5, the text displayed on the screen is an example of newly displayed information having continuity with the previously displayed text information in FIG. 4. As illustrated in FIG. 5, a vector having an origin at the center of the information display area and an end point at the touched point is pointed in a specific direction, in which the displayed information is scrolled on the line-by-line basis. A reference numeral 60 of FIG. 5 represents a moving direction of the displayed information. The moving direction of the displayed information in this case is an opposite direction of the specific direction on which the new information is positioned.

Figure 6:
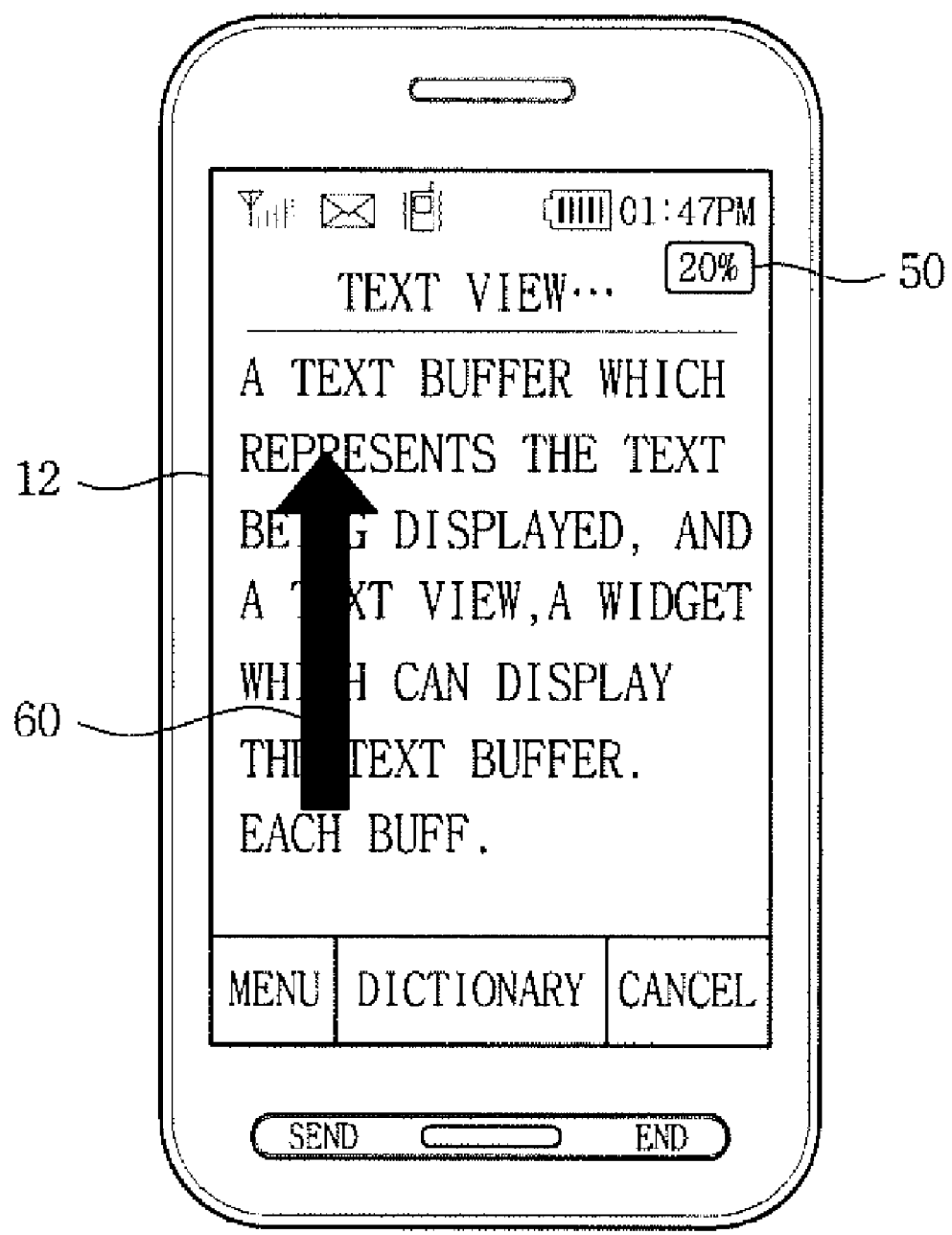
FIG. 6 illustrates an example of a screen scrolled or jumped on a page-by-page basis from a previous screen, according to the first embodiment of the present invention.

The text displayed on the screen in FIG. 6 is another example of new information displayed in response to the user's touch on the point shown in FIG. 4 in which the displayed information is moved or "jumped to" on the page-by-page basis. The jump manner of moving displayed text may further include jumping to new information for displaying on a file-by-file basis.

A region of the information display area in the touch input module may be divided into a plurality of sub-regions to which different directions are assigned, thus the specific direction is determined according to the direction assigned to the sub-direction where a position of a touched point belongs.

Figure 8:
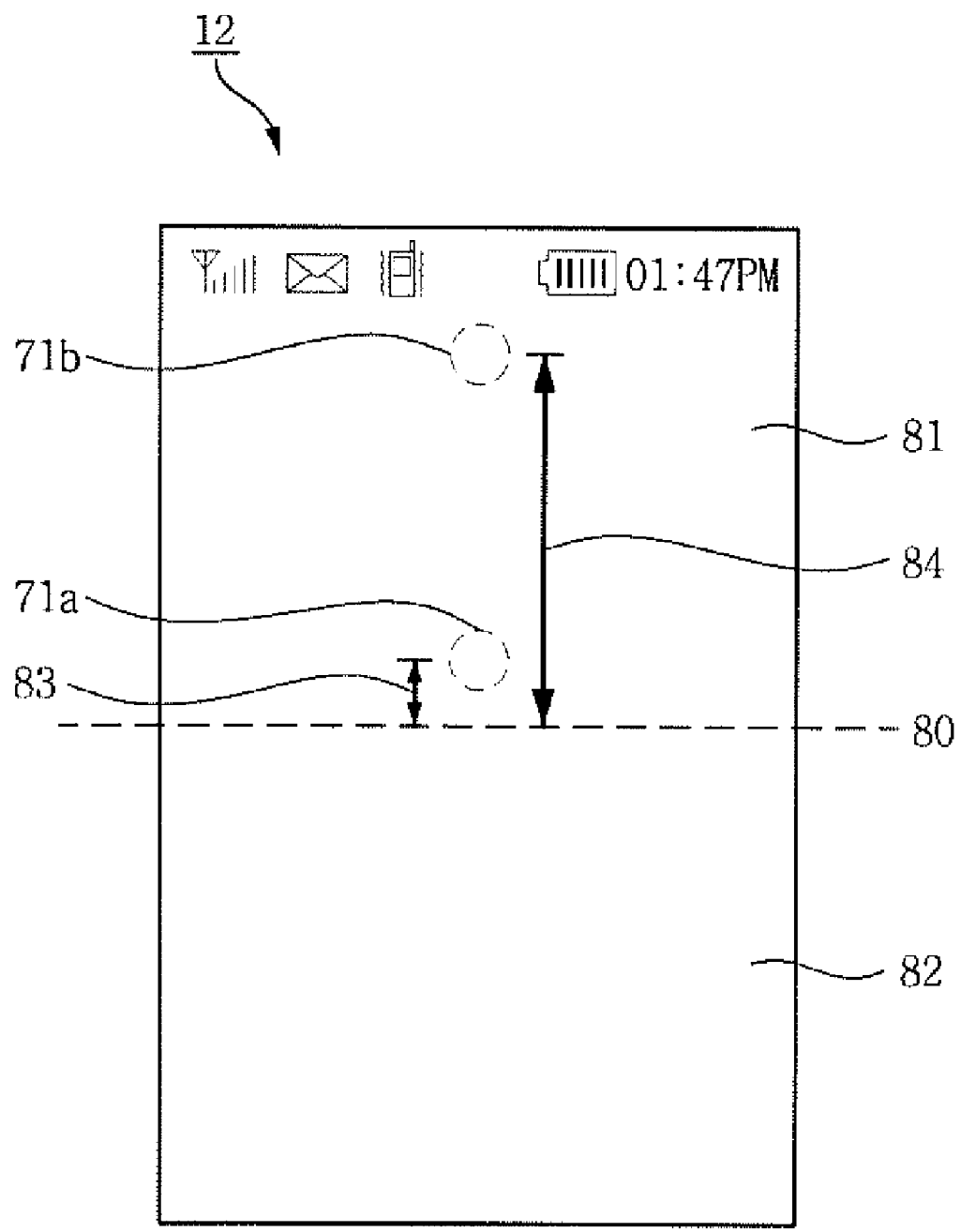
FIG. 8 illustrates varying a speed of new information display, according to the first embodiment of the present invention.
Figure 9:
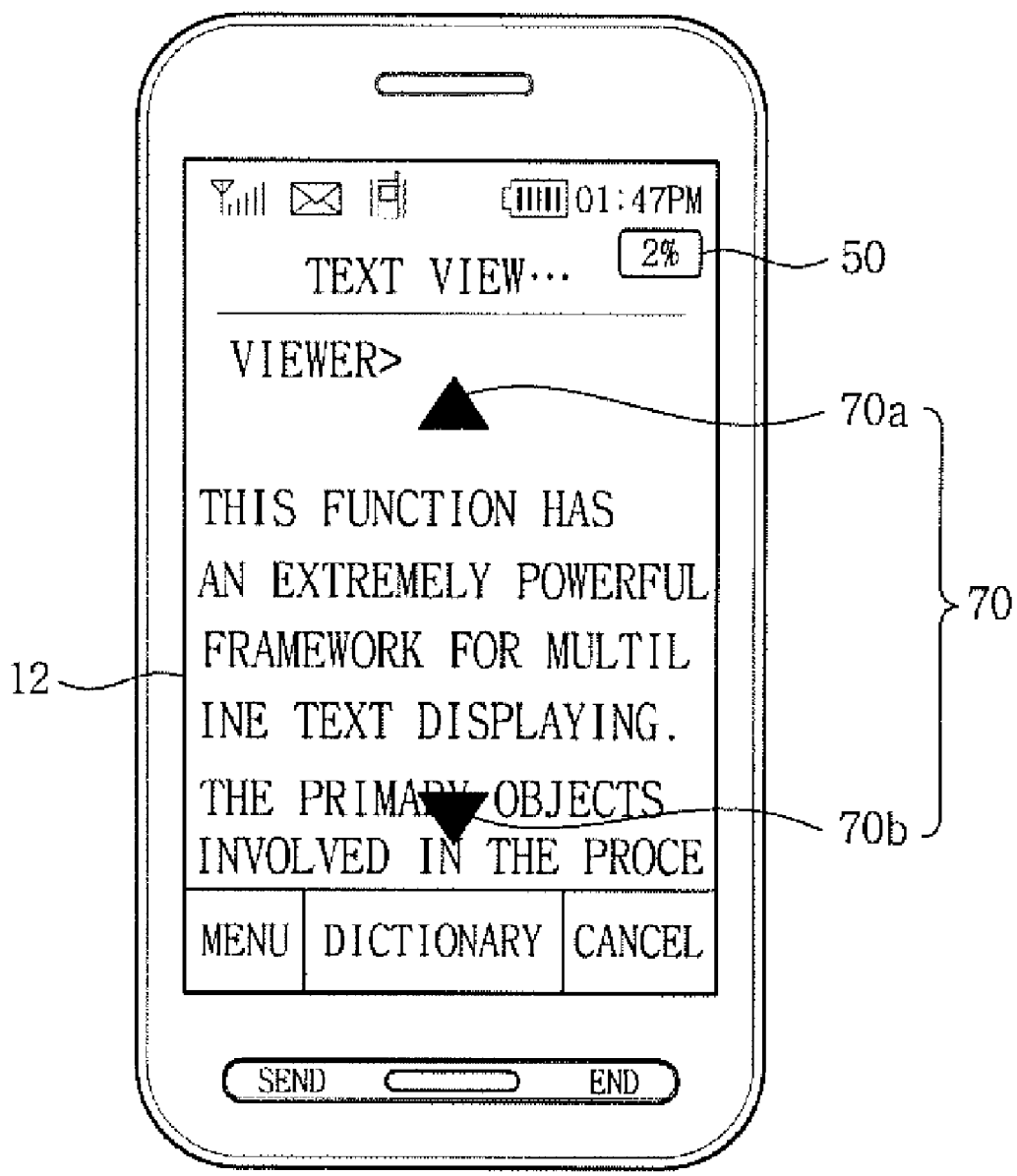
FIG. 9 illustrates an example of indicators for moving displayed information, according to the first embodiment of the present invention.

For example, referring to FIG. 8, an up direction may be assigned to a first sub-region 81, and a down direction may be assigned to a second sub-region 82. When a point on the first sub-region 81 is touched, a part of an information positioned at the up direction of a currently displayed information is newly displayed while a part of the currently displayed information is disappeared, in which the amount of the newly displayed information is the same as that of the disappeared information.

The region of the information display area on the touch input module 12, illustrated in FIG. 8, is divided into two sub-regions. This is described by way of example and the embodiment of the present invention is not limited thereto. The region of the information display area may be divided into more than two sub-regions, and a different direction may be assigned to each of the divided sub-regions. For example, the information display area may be divided into four sub-regions and an up, down, left or right direction may be assigned to each of the divided sub-regions.

Alternatively, different directions may be assigned only to predetermined sub-regions of the information display area. Thus, the step of S320 is performed when one of the predetermined sub-regions is touched. For example, referring to FIG. 9, a sub-region occupied by an up arrow 70a is assigned with an up direction and another sub-region occupied by a down arrow 70b is assigned with a down direction. Therefore, when a user touches anywhere on the screen, an arrow will appear depending on the touched location and the display content can be scrolled either up or down in accordance with the displayed arrow.

A speed of displaying new information at step S320 may be variable according to a distance from the touched point to the reference point or the reference line.

Referring back to FIG. 8, the up direction is assigned to the first sub-region 81 and the down direction is assigned to the second sub-region 82 as described above. Two examples will be compared: the first example is that a first point 71a at the first sub-region is touched and the second example is a second point 71b at the first sub-region is touched. A speed of displaying new information for the first example may be set to be faster than that for the second example. Thus, the new information can be displayed faster when a user touches a point at a longer distance from the reference line 80.

Alternatively, the speed of displaying new information may be variable according to a duration time for a continued touch or a number of touches. For example, if the same point is touched, the speed of displaying new information may become faster when the duration time of the touch is increased. For another example, the speed of displaying new information may become faster when the number of touches increases during a predetermined period of time even if the same point is touched. The speed of displaying the new information may be in linear, nonlinear or discrete proportion to the duration time of the touch or the number of touches.

The amount of new information displayed at the step S320 may be varied according to duration times for the continued touch on the information display area or the number of touches. For example, a series of new information may be continuously displayed, or an amount of the new information displayed at once becomes larger when the duration time of the touch or the number of touches increases. Assuming that the amount of new information displayed at once corresponds to one line, then the amount of new information displayed in total may become two lines when the same point is touched twice in a predetermined period, and may become three lines when the same point is touched three times in a predetermined period.

At the step S320, new information may be displayed by scrolling the information displayed at step S300 at a predetermined speed. For example, the text in FIG. 4 is scrolled to proceed to display the new information of the text in FIG. 5.

Alternatively, at step S320, new information may be displayed as being jumped from the information displayed at step S300. Herein, the screen displaying the text in FIG. 4 is updated immediately in a jump manner to display the new information of the text in FIG. 6.

After completion of step S320, updated information displayed on the screen may contain the information displayed at step S310. For example, the updated information shown in FIG. 5 displays a part of the information displayed at the step S310 since the new information is displayed on the line-by-line basis.

On the other hand, the updated information displayed on the screen may not contain the information displayed at step S310. For example, the updated information shown in FIG. 6 does not display the information displayed at the step S310 since the new information is displayed on the page-by-page basis.

Referring back to FIG. 9, the touch input module 12 may display the indicators 70 for pointing specific directions in accordance with a control signal from the controller 14. Upon touching one of the indicators 70, the touch input module may display new information having continuity with the currently displayed information in the direction pointed by the corresponding indicator. The first indicator 70a points the up direction for moving of the displayed information, and the second indicator 70b points the down direction.

At this time, the controller may display the indicators 70 only when the touch continues or occurs at step S310.

A feedback may be outputted in response to the touch under the control of the controller (S330). An example of the feedback may be a vibration generated by a vibration module of the electronic device 100. The user may receive feedback of his or her operation through the vibration. In another example, the feedback may be generated by a light-emitting element, such as an LED of the electronic device 100.

Figure 10:
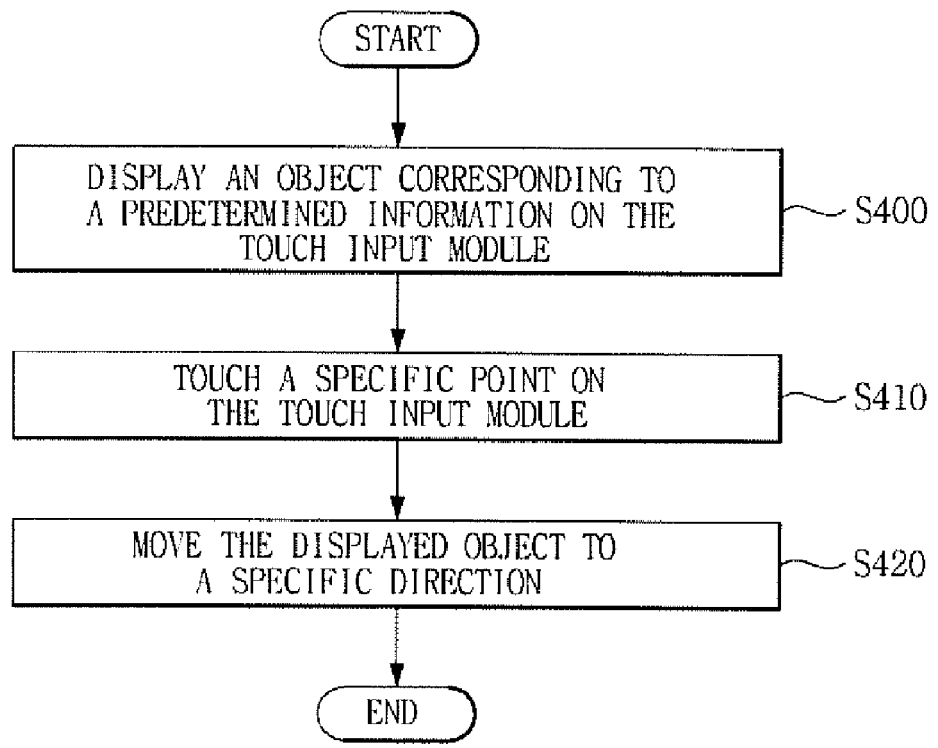
FIG. 10 is a flow chart illustrating a method for displaying information using the electronic device with the touch input module according to a second embodiment of the present invention.
Figure 11:
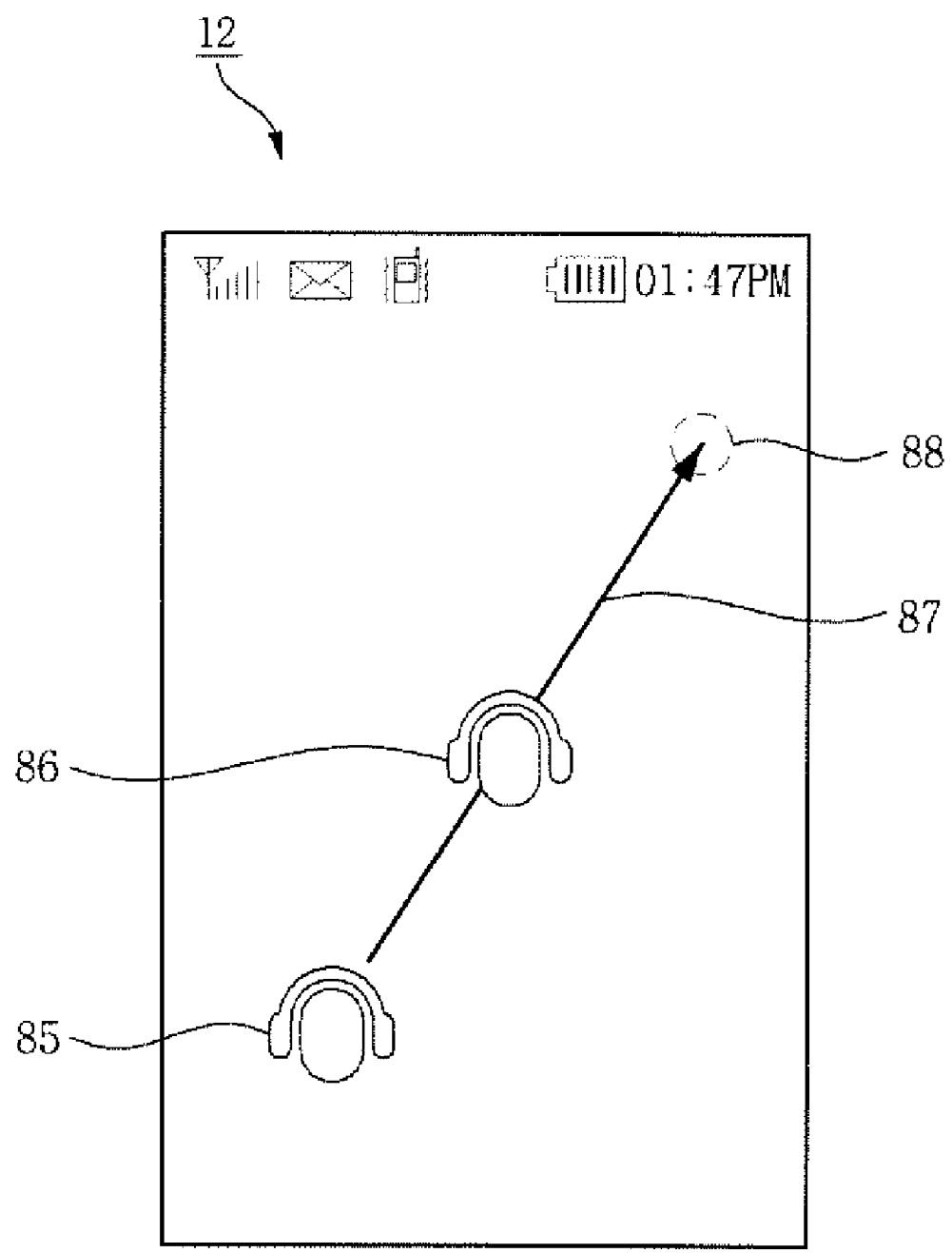
FIG. 11 illustrates an example where an object is moved in a specific direction, according to the second embodiment of the present invention.

Hereinafter, the information display method using the electronic device 100 according to the second embodiment of the present invention will be described in more detail with reference to FIGS. 10 and 11. FIG. 10 is a flow chart illustrating the method for displaying information using the electronic device 100 having the touch input module according to a second embodiment of the present invention. FIG. 11 illustrates an example where an object is moved according to the second embodiment of the present invention.

At first, the touch input module 12 displays an object 85 representing predetermined information (S400). Examples of the object 85 may be an icon displayed at an initial screen or a specific object in a game application.

The controller 14 determines whether there is a touch on a point of the touch input module 12 (S410). In FIG. 11, a reference numeral 88 represents the touched point.

Accordingly, the controller 14 moves the object 85 for a predetermined distance in a specific direction determined based on a position of the touched point 88 as described above (S420).

In FIG. 1, the object 85 is moved to a position 86 in a direction pointed by a vector 87 having an origin at a position of the object and an end point at the touched point 88.

According to the embodiments of the present invention, the electronic apparatus with the touch input device screen and the method using the same may display information as moving the information in a convenient and effective way using features of the touch input device.

The embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of controlling a touch screen of a mobile terminal, the method comprising:
displaying data information in a display area of the touch screen;
receiving a touch input at a position of the data information displayed in the display area of the touch screen;
scrolling the displayed data information in response to the touch input, the scrolling comprising controlling movement of at least a portion of the data information displayed in the display area according to the position of the touch input; and
displaying new data information in the display area when the displayed data information is scrolled, wherein the new data information has a continuity with the data information displayed in the display area before the scrolling,
wherein the data information displayed in the display area is distinguishable from graphic icons and menu icons displayed in the display area,
wherein the display area comprises a reference position,
wherein a speed of the movement of the at least the portion of the data information is determined based on a distance between the position of the touch input and the reference position, and
wherein a direction of the movement of the at least the portion of the data information is determined according to the position of the touch input with regard to the reference position.

2. The method of claim 1, wherein the reference position is a point or a line.

3. The method of claim 1, wherein the speed of the movement is increased in proportion to an increase in the distance between the position of the touch input and the reference position.

4. The method of claim 1, wherein the movement of the at least the portion of the data information in the display area is controlled in response to a touching manner of the touch input.

5. The method of claim 4, wherein the touching manner comprises a touch duration.

6. The method of claim 4, wherein the speed for the movement of the at least the portion of the data information is adjusted in response to the touch manner of the touch input.

7. The method of claim 1, wherein the movement of the at least the portion of the data information is performed in a page-by-page manner.

8. The method of claim 1, wherein the movement of the at least the portion of the data information is performed in a file-by-file manner.

9. The method of claim 1, wherein the data information is displayed in the display area in response to executing an application program.

10. The method of claim 1, further comprising generating a feedback in response to the touch input.

11. The method of claim 10, wherein the feedback comprises a vibrating feedback or an indicator icon being displayed in the display area.

12. The method of claim 1, wherein the reference position is established when an amount of the data information is greater than the display area, such that all of the data information cannot be displayed to fit in the display area.

13. The method of claim 12, wherein the reference position is defined at a center of the display area.

14. The method of claim 1, wherein:
the display area is divided into a plurality of regions to which different directions are assigned with respect to the reference position, and
the direction of the movement of the at least the portion of the data information is determined according to a direction assigned to one of the regions in which the position of the touch input is included.

15. The method of claim 14, wherein:
if the position of the touch input belongs to a first region of the plurality of regions, the direction of the movement of the at least the portion of the data information is determined as an up direction, and
if the position of the touch input belongs to a second region of the plurality of regions, the direction of the movement of the at least the portion of the data information is determined as a down direction.

16. The method of claim 1, wherein at least a portion of the data information displayed in the display area before the scrolling is not displayed after the scrolling when the new data information is displayed in the display area.

17. A mobile terminal, comprising:
a display unit comprising a touch screen for:
displaying data information in a display area of the touch screen; and
receiving a touch input at a position of the data information displayed in the display area of the touch screen; and a controller for:
scrolling the displayed data information in response to the touch input, the scrolling comprising controlling movement of at least a portion of the data information in the display area according to the position of the touch input; and
causing the display unit to display new data information in the display area when the displayed data information is scrolled, wherein the new data information has a continuity with the data information displayed in the display area before the scrolling,
wherein the data information displayed in the display area is distinguishable from graphic icons and menu icons displayed in the display area,
wherein the display area comprises a reference position,
wherein a speed of the movement of the at least the portion of the data information is determined based on a distance between the position of the touch input and the reference position, and
wherein a direction of the movement of the at least the portion of the data information is determined according to the position of the touch input with regard to the position.

18. The mobile terminal of claim 17, wherein the movement of the at least the portion of the data information is performed in a page-by-page manner.

19. The mobile terminal of claim 17, wherein the movement of the at least the portion of the data information is performed in a file-by-file manner.

20. The mobile terminal of claim 17, wherein the controller generates a feedback in response to the touch input.

21. The mobile terminal of claim 20, wherein the feedback comprises a vibrating feedback or an indicator icon being displayed in the display area.

22. The mobile terminal of claim 17, wherein an entire portion of the data information displayed in the display area is moved when the displayed data information is scrolled.

23. The mobile terminal of claim 17, wherein the speed of the movement is increased in proportion to an increase in the distance between the position of the touch input and the reference position.

24. The mobile terminal of claim 17, wherein the speed of the movement of the at least the portion of the data information is increased when the touch input is maintained.

25. The mobile terminal of claim 17 wherein:
the display area is divided into a plurality of regions to which different directions are assigned with respect to the reference position, and
the direction of the movement of the at least the portion of the data information is determined according to a direction assigned to one of the regions in which the position of the touch input is included.

26. The mobile terminal of claim 25, wherein:
if the position of the touch input belongs to a first region of the plurality of regions, the direction of the movement of the at least the portion of the data information is determined as an up direction, and
if the position of the touch input belongs to a second region of the plurality of regions, the direction of the movement of the at least the portion of the data information is determined as a down direction.

27. The method of claim 17, wherein at least a portion of the data information displayed in the display area before the scrolling is not displayed after the scrolling when the new data information is displayed in the display area.

* * * * *